Patented Aug. 16, 1927.

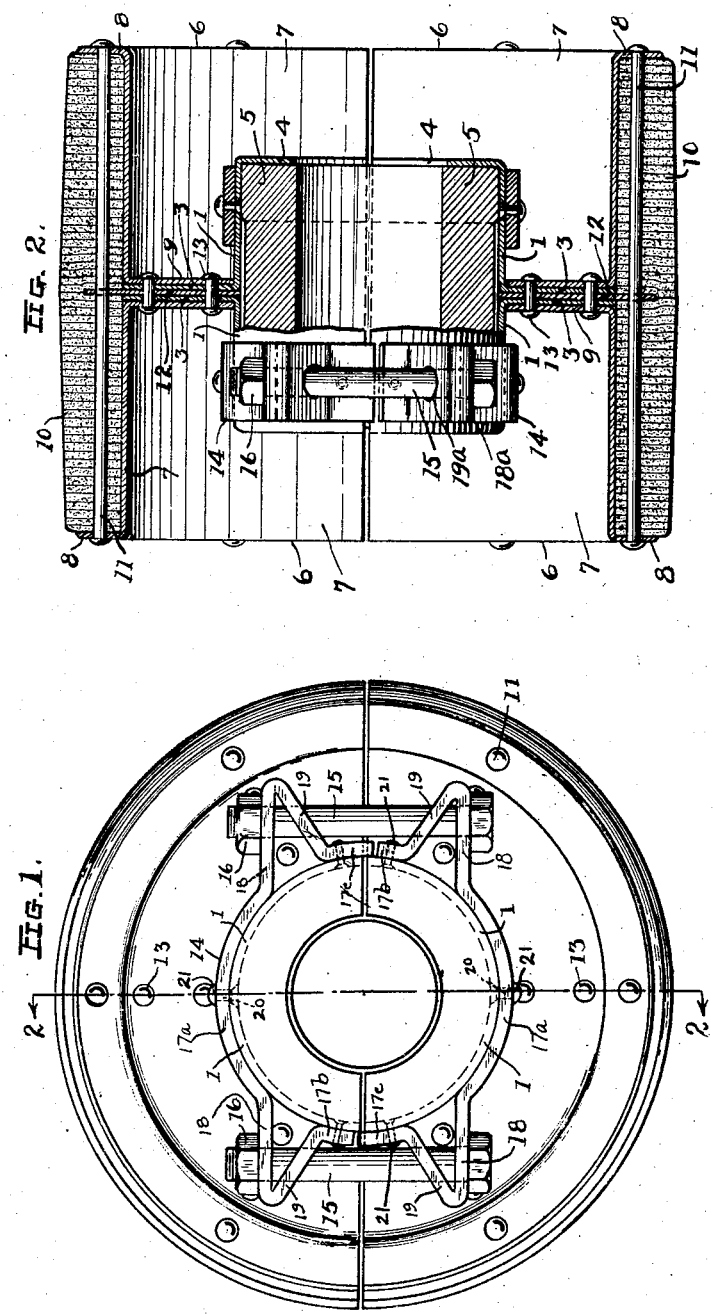

1,639,489

UNITED STATES PATENT OFFICE.

PATRICK CULHANE, OF CLEVELAND, OHIO, ASSIGNOR, BY MESNE ASSIGNMENTS, TO WILLIAM T. HENSLEY, OF INDIANAPOLIS, INDIANA.

PULLEY.

Application filed October 26, 1925. Serial No. 64,811.

This invention relates to relatively large laminated pulleys, that is, pulleys of sufficient diameter so that it is preferable to have rim and hub portions with an intervening web portion. It more particularly relates to clamping means particularly adapted to firmly position sectional pulleys of the above type in assembled relation and to firmly engage such pulleys to a shaft.

An object of the invention is to provide a means for uniting pulley sections of the type having rim and hub portions and an intervening web portion.

Another object of the invention is to provide a means for attaching sectional pulleys to a shaft.

A further object of the invention is to provide a relatively light sectional pulley having a rim portion and a hub portion and a means for clamping the pulley sections in assembled relation on a shaft.

Another object of this invention is to provide for sectional pulleys, clamping means comprising clamp portions adapted to be permanently attached to each pulley section and means adapted to cooperate with said clamp portions to maintain said pulleys in assembled relation, as on a power shaft.

A further object of the invention is to provide clamping means for a pulley comprising clamp portions formed from bar stock and adapted to be firmly attached to a pulley section and to cooperate with fastening means, such as, for example, bolts and nuts.

Other objects of this invention will be apparent to those skilled in the art from the description of it hereinafter given.

In the drawings Fig. 1 is a side elevation of an assembled sectional pulley having rim and hub portions, and clamping means for fastening the sectional portions in said assembled relation.

Fig. 2 is a sectional view on line 2—2 of Fig. 1, a portion of the hub and cooperating clamping means being shown in elevation.

Fig. 3 is a perpsective view of a clamp portion according to my invention.

The pulley sections shown in the accompanying drawings, and assembled with clamping means according to my invention are each shown as comprising a rim portion and a hub portion spaced from each other and connected by an intervening web portion. The clamping means are shown as comprising clamp portions attached to the hub portions and fastening means, such as bolts and nuts, for maintaining the pulley sections in assembled relation. It is obvious, of course, that the clamping means embodied by my invention may be employed with various types of pulleys.

The form of pulley illustrated comprises two halves, and the hub unit of each pulley section or half is shown as comprising a pair of opposed sheet metal cup portions 1, each of which has a web portion 3 and an inwardly extending end flange 4. The cup portions 1 together encase the hub core or bushing portions 5, which may be of any suitable, such as fibrous or metallic, material giving the requisite strength and rigidity to the hub of the pulley.

The rim portion of each pulley section with which the previously described hub portions are adapted to be assembled, comprises a pair of end plates 6, each of said end plates having a semi-circumferential rim supporting portion 7, an outwardly extending end flange 8, and an inwardly extending web portion 9 adapted to be united with hub member web portions 3.

The driving face of the pulley is shown as being made up of laminated units 10, which may be composed of fibrous material. Rim rivets 11 between the opposed flanges 8 may be employed to maintain the laminated units 10 in rigid position between the end plates 6.

An intermediate plate 12, shown as interposed between the web portions 3 and 9 and extending into the fibrous material 10, may be employed for additional strengthening purposes. Web rivets 13 are shown as securing the web portions 3, 9 and 12 rigidly together.

Disposed around the hub portions are shown the clamping means embodied by my invention. Such clamping means may comprise clamp portions 14 and fastening means, such as bolts 15 and nuts 16. In the drawings a substantially symmetrical clamp portion 14 is disposed on the perimetric surface of each cup portion 1. Each clamp portion 14 may be composed of strip metal such as bar stock bent at the central portion 17ª and at the end portions 17ᵇ and 17ᶜ to conform substantially to the perimetric or circumferential surface of a cup portion 1. End 17ᶜ may be made slightly longer than end 17ᵇ for purposes of convenience in assembling the pulley sections on a shaft as will be readily understood by those skilled in the art. The central portion 17ª preferably contacts with a relatively large portion of the perimetric surface of a cup portion 1.

From the central portion 17ª, portions 18 extend outwardly in a direction preferably substantially perpendicular to the transverse median plane of the clamp portion 14. From the portions 18 the strip metal is bent back angularly to form portions 19, the portions 18 and 19 connecting the portion 17ª with portions 17ᵇ and 17ᶜ. Located in the portions 18 and 19 are aligned holes 18ª and 19ª whose axis is preferably perpendicular to the plane of portion 18. These holes 18ª and 19ª are adapted to receive fastening means such as bolts as shown in Figs. 1 and 2.

The clamp portions 14 may be permanently affixed to the pulley sections in any suitable manner, such as by welding or riveting. Holes 20 are shown in the strip metal for the accommodation of rivets or the like, and in Figs. 1 and 2 the clamp portions are shown as permanently affixed by rivets 21 in holes 20 to the cup portions 1. The location of the clamp portions 14 is preferably such that the transverse median axes thereof pass through the center of the assembled pulley and are perpendicular to the split diameter of said assembled pulley. With the clamp portions 14 attached to the pulley sections as described hereinabove, the said pulley sections may be placed in assembled relation on a power shaft as shown in Figs. 1 and 2. It will be noted that when the pulley is in assembled relation, the aligned holes 18ª and 19ª in one pulley section are in alignment with the aligned holes 18ª and 19ª in the opposed clamp portion in the other pulley section. Fastening means such as bolts 15 may be passed through the oppositely disposed sets of aligned holes 18ª and 19ª and nuts 16 affixed to the ends of said bolts and tightened to affix the pulley sections in assembled relation on the power shaft.

It will be noted that the portions 19 act as braces and give stiffness and strength to the clamp portions 14 when the pulley sections are in assembled relation on a power shaft. It will also be noted that the surfaces 18 provide bearing surfaces for headed fasteners such as the bolts 15 and nuts 16.

It will also be seen that by forming a clamp portion 14 in the manner hereinabove described and by employing material such as bar stock therefor, that strong and yet relatively inexpensive and durable clamp portions may be made.

It will further be seen that by my invention I have provided a simple and economical means for assembling sectional pulleys and maintaining said pulleys in assembled relation on a power shaft.

To those skilled in the art many alterations in construction and widely differing embodiments and applications of my invention will suggest themselves without departing from the spirit and scope of the invention. Thus, my disclosures and descriptions herein are purely illustrative and are not intended to be in any sense limiting.

What I claim is:

1. A clamp portion for sectional pulleys comprising a metal strip shaped at its central portion to conform to a substantial portion of the perimetric surface of a pulley hub and having end portions shaped to conform to other portions of the same surface, and having intermediate portions between said central and end portions that extend away from said surface and are then bent back to extend toward said surface, said intermediate portions being perforated to receive fastening means.

2. A clamp portion for sectional pulleys comprising a metal strip shaped at its central and end portions to substantially conform to portions of the perimetric surface of a pulley hub and having intermediate portions bent away from said surface and then bent back to extend toward said surface, said intermediate portions having holes therein for receiving fastening means, said end portions being of different lengths whereby one end portion overlies the break between the pulley sections when mounted thereon.

3. A clamp portion for sectional pulleys comprising a metal strip shaped at its central and end portions to substantially conform to portions of the perimetric surface of a pulley hub and adapted to be securely fastened to said hub and having intermediate portions extending outwardly from said central portion substantially perpendicularly to the transverse median plane of said strip to form bearing surfaces for fastening means and extending angularly back to the end portions to form stiffening members, said intermediate portions connecting said central and end portions and having aligned holes therein for receiving fastening means.

4. A clamp portion for sectional pulleys comprising a metal strip shaped at its central and end portions to substantially conform to relatively large and to small portions, respectively, of the perimetric surface of a pulley hub and having holes therein for means to fasten said clamp portion securely to said hub and having intermediate portions extending outwardly from said central portion substantially perpendicularly to the transverse median plane of said strip to form bearing surfaces for fastening means and extending angularly back to the end portions to form stiffening members, said intermediate portions connecting said central and end portions and having aligned holes therein for receiving fastening means, the axes of said holes being substantially perpendicular to the plane of said outwardly extending portions.

In testimony whereof I affix my signature.

PATRICK CULHANE.